United States Patent Office 2,830,065
Patented Apr. 8, 1958

2,830,065

12-CYANO-12-HYDROXYSTEARIC ACID AND THE LOWER ALKYL ESTERS THEREOF

Thomas R. Steadman, Waban, and John O. H. Peterson, Jr., Medford, Mass., assignors to National Research Corporation, Cambridge, Mass., a corporation of Massachusetts No Drawing. Application April 23, 1956
Serial No. 579,713

3 Claims. (Cl. 260—404)

This invention relates to the production of chemicals and in particular to the production of a novel acid and esters thereof.

A principal object of the present invention is to illustrate the preparation and properties of the new compositions of matter, 12-cyano-12-hydroxystearic acid and esters thereof.

Other objects of the invention will in part be obvious and will in part appear hereinafter.

The invention accordingly comprises the new composition of matter possessing the features and properties which are exemplified in the following detailed disclosure, and the scope of the application of which will be indicated in the claims.

For a fuller understanding of the nature and objects of the invention, reference should be had to the following detailed disclosure.

The present invention is directed to new compositions of matter which comprise 12-cyano-12-hydroxystearic acid and esters thereof. These compounds have been found to have considerable utility. For example, the acid can be dehydrated and then hydrogenated to form 12-aminomethylstearic acid which is useful in the manufacture of desirable condensation polymers, or it can be dehydrated, hydrolyzed and hydrogenated to form 2-hexyltridecanedioic acid which is useful in the manufacture of plasticizers, plastics and synthetic lubricants.

Specific detailed methods of producing 12-cyano-12-hydroxystearic acid and the methyl ester thereof are set forth in the following non-limiting examples.

*Example I*

A solution consisting of 0.1 mole of 12-ketostearic acid, 250 mls. of chloroform and 150 mls. of methanol was made alkaline with methanolic sodium hydroxide. The sodium salt of the 12-ketostearic acid was brought into solution by the addition of 30 mls. of water. A ten-fold excess of hydrogen cyanide (1.0 mole) was added to the solution, which was then allowed to stand overnight. The reaction mixture was then acidified to a pH of 2 with concentrated phosphoric acid and distilled in vacuo to remove the solvents. Sodium phosphate was removed by filtration after all the water had been distilled off.

The waxy, pale yellow residue contained 75.5 percent of the theoretical quantity of 12-cyano-12-hydroxystearic acid. Purified material with a melting point of 47°–48° C. was recovered by extracting the unreacted 12-ketostearic acid from the crude material with petroleum ether.

A sample (0.7662 gram) of purified acid was heated for 30 minutes at 60°–70° C. with 25 mls. of a 0.56 N aqueous sodium hydroxide solution. The solution was then filtered and neutralized with 0.6180 N methanolic HCl using a mixed methyl red, methylene blue indicator. A solution of 50 mls. of potassium mercuric chloride was added to the mixture at 0° C. and the HCl liberated was determined immediately by titration with 0.1164 N aqueous sodium hydroxide. It was determined that the acid was 93.6 percent pure.

*Example II*

A solution containing 0.187 mole of methyl 12-ketostearate, 1.87 moles of hydrogen cyanide, 1.0 ml. of n-butylamine and 45 mls. of chloroform was allowed to come to equilibrium in a closed system. The mixture was then acidified with concentrated phosphoric acid and the excess hydrogen cyanide and chloroform were removed by distillation. The pale yellow residual oil contained 66.2 percent of the theoretical quantity of methyl 12-cyano-12-hydroxystearate.

*Example III*

A solution containing 0.072 mole of methyl 12-ketostearate, 1.29 moles of hydrogen cyanide and 0.2 ml. of n-butylamine was allowed to react for approximately 24 hours in a closed system. The solution was then acidified with concentrated phosphoric acid. The excess hydrogen cyanide was removed by distillation of the acidified solution. The residual oil contained 43.4 percent of the theoretical quantity of methyl 12-cyano-12-hydroxystearate.

The above reactions can be represented by the following equation:

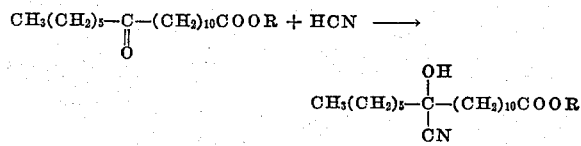

where R is either a hydrogen (—H) or an alkyl group or radicle such as methyl (—CH₃), ethyl (—C₂H₅), etc., or an aryl group such as phenyl (—C₆H₅), etc. The glycerides of the keto acid also proceed as above.

Since certain changes may be made in the above compositions of matter without departing from the scope of the invention herein involved, it is intended that all matter contained in the above description shall be interpreted as illustrative and not in a limiting sense.

What is claimed is:
1. The new chemical compound, 12-cyano-12-hydroxystearic acid.
2. The new chemical compounds of the general formula

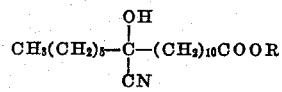

where R is selected from the group consisting of hydrogen and lower alkyl radicals.
3. The new chemical compound, methyl 12-cyano-12-hydroxystearate.

References Cited in the file of this patent
UNITED STATES PATENTS
2,391,251     Long _____ Dec. 18, 1945